United States Patent

[11] 3,572,971

| [72] | Inventor | David L. Seiwert<br>West Chester, Ohio |
| --- | --- | --- |
| [21] | Appl. No. | 861,975 |
| [22] | Filed | Sept. 29, 1969 |
| [45] | Patented | Mar. 3, 1971 |
| [73] | Assignee | General Electric Company<br>Continuation-in-part of application Ser. No. 666,373, Sept. 8, 1967, now abandoned. |

[54] LIGHTWEIGHT TURBO-MACHINERY BLADING
6 Claims, 3 Drawing Figs.

[52] U.S. Cl. ..................................................... 416/230, 416/241
[51] Int. Cl. ..................................................... F01d 5/14
[50] Field of Search ........................................... 416/224, 229, 230, 241

[56] References Cited
UNITED STATES PATENTS

| 2,920,868 | 1/1960 | Ackerman et al. | 416/230 |
| 2,929,755 | 3/1960 | Porter | 416/229(X) |
| 3,032,317 | 5/1962 | Frank | 416/230(X) |
| 3,132,841 | 5/1964 | Wilder | 416/229(X) |

FOREIGN PATENTS

| 722,341 | 1/1955 | Great Britain | 416/230 |
| 901,075 | 7/1962 | Great Britain | 416/230 |

*Primary Examiner*—Everette A. Powell, Jr.
*Attorneys*—Derek P. Lawrence, E. S. Lee, III, Lee H. Sachs, Frank L. Neuhauser, Oscar B. Waddell and Joseph B. Forman ABSTRACT: The disclosure shows two lightweight, aerodynamic blades for use in lightweight compressors and, particularly, as stator vanes therefor. One blade comprises a core formed by bonded, longitudinally extending glass fibers, clad within a metallic skin bonded thereto. The other blade comprises a core of longitudinally extending, bonded graphite fibers, clad within a titanium skin of a selected thickness bonded thereto.

Patented March 30, 1971 3,572,971
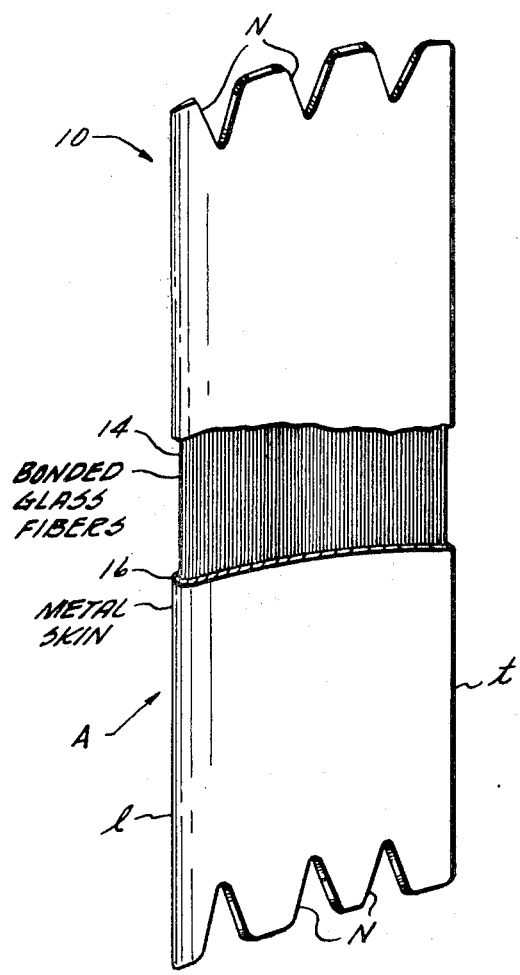
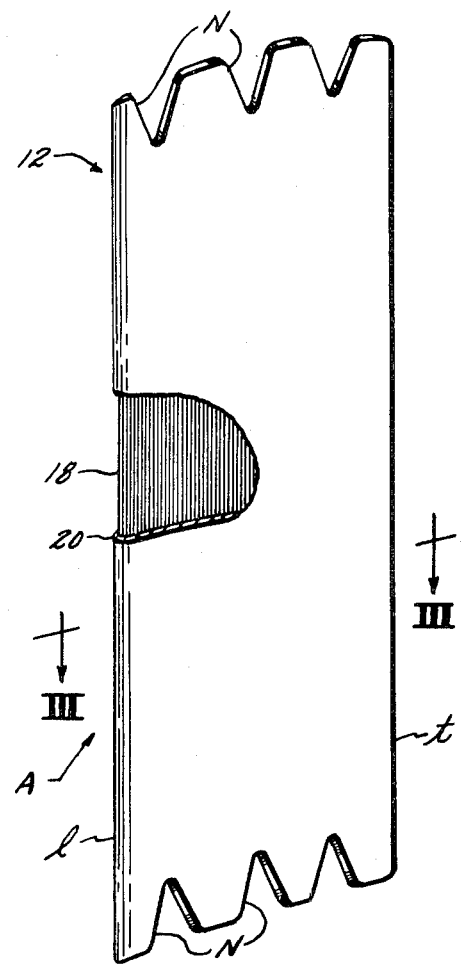
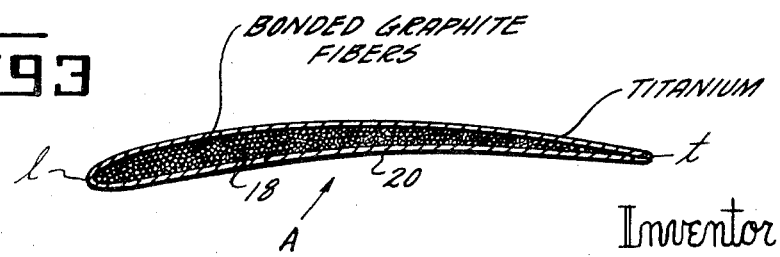
Inventor
DAVID L. SEIWERT
ATTORNEY

LIGHTWEIGHT TURBO-MACHINERY BLADING

The present application is a continuation-in-part of copending application Ser. No. 666,373, filed Sept. 8, 1967 now abandoned.

The present invention relates to improvements in turbomachinery and, more particularly, to improved, lightweight blading for axial flow compressors employed in turbomachinery.

At least since the first use of gas turbine engines for the propulsion of aircraft, there has been a pressing demand for reduced weight of the engine power plant. Intensive research and development efforts have been carried on to increase the thrust-to-weight ratio of such engines, leading to many innovations and technological breakthroughs. Today the demand for greater increases in thrust-to-weight ratios are further stimulated by the desire for aircraft capable of landing or taking off with little or no runway length, commonly referred to as V/STOL aircraft.

To accomplish the V/STOL mission, it is proposed to employ direct lift engines which provide a downward thrust effective during landing or takeoff, with forward propulsion being provided by other engines. Extremely high thrust-to-weight ratios are of extreme importance to the success of such direct lift engines since in the forward mode of operation of the aircraft, these engines are idle and become dead weight in the aircraft system.

To meet the desired objective of high thrust-to-weight ratios it has been proposed and much work has been done in the substitution of compositely formed components for conventional metallic components. Because of its high strength-to-weight ratio and its widespread use in other fields, bonded glass fibers have been proposed extensively as a composite material for use in the cooler portions of a gas turbine engine. It has also been recognized and considerable work has been done in forming composite materials from fibers of boron and graphite, as well as others, to obtain extremely large strength-to-weight ratios, enabling a consequent reduction in the overall weight of an engine of a given size and type.

In some instances the substitution of lightweight composite materials has been a fairly routine matter. However, the stress loadings on compressor blades have posed particularly difficult problems to the use of lightweight composite materials. The stress loadings on such blades are three dimensional, i.e., longitudinal, a beam loading, or, in the case of rotor blades, a centrifugal loading; transverse, from the leading to trailing edge; and torsional, a twisting due to unbalanced gas forces thereon. Recognizing that the fibers or filaments of laminate materials have essentially only unidirectional strength, many proposals have been made to orient the fibers in various fashions to satisfactorily take the three primary types of force loadings on the blades, but none of these proposals has been wholly acceptable, particularly in meeting the high performance characteristics demanded of such engines.

Another problem of particular significance to blading for compressors or the like is the requirement of stiffness. Stiffness is demanded in order that the blading will retain the designed aerodynamic configuration in operation and, further, in order that natural resonant frequencies will not be induced in the blading during operation, causing it self-destruction, even though the aerodynamic loadings thereon are within tolerable limits.

Yet another problem encountered in the use of fibrous composite materials, particularly those having a low specific weight, is that of abrasion resistance. In the operation of gas turbine engines it is unavoidable that dirt, sand, and other abrasive materials will be ingested into the engine and passed over the turbomachinery blading and, particularly, through the compressor of such engines. The abrasive material encountered in practical operation seriously shortens the lift of conventional fibrous composite materials.

It has been proposed in the patent art to employ metal sheaths to overcome vibration and abrasion problems. However, such proposals have not met with any significant acceptance because of the more fundamental strength problems.

Accordingly, the object of the invention is to minimize, if not entirely overcome, the problems outlined above in the utilization of fibrous composite materials and, particularly, to provide an improved, fibrous composite blade, enabling a reduction in the weight of turbomachinery and, particularly, compressors of gas turbine engines, to thereby obtain increases in the thrust-to-weight ratio of the engines.

These ends are attained in accordance with one aspect of the invention by a compressor blade having a fibrous core, comprising bonded, longitudinally extending fibers and clad within a metal skin which is bonded to the core, whereby the fibers may most effectively take the substantially greater longitudinal stresses and the metal skin provides the desired transverse and torsional strength. This gives the further advantage of protection for the fibers from the abrasive action of sand or dirt particles passing through the compressor. This is of particular significance in extending the usefulness of glass fiber composites in fabricating turbomachinery blades, to take advantage of the highly developed technology for manufacturing glass fibers and the techniques for handling and bonding glass fibers.

Another aspect of the invention is found in forming a blade wherein the core comprises longitudinally extending fibers, bonded together. This core is also clad with a metal skin bonded to the core. In order to provide the most efficient utilization of material, the fibers and the metal of the cladding are selected so that the modulus of elasticity (E) of the metal approximates or is less than the E of the composite fiber core. Further, the thickness of the skin is selected as the maximum necessary for it to be stressed within workable limits of its ultimate strength to accept the transverse loadings on the blade. Preferred materials are pyrolytic graphite fibers for the core and titanium for the skin.

The above and other related objects and features of the invention will be apparent from a reading of the following description of the disclosure found in the accompanying drawing and the novelty thereof pointed out in the appended claims.

In the drawings:

FIG. 1 is a perspective view, with portions broken away, of a turbomachinery stator blade embodying the present invention;

FIG. 2 is a perspective view, with portions broken away, of another turbomachinery stator blade embodying the present invention; and FIG. 3 is a section, taken on line III—III on an enlarged scale.

The aerodynamic blades or vanes 10 and 12, of FIGS. 1 and 2 respectively, have notches N at their opposite longitudinal ends to facilitate their attachment to feet (not shown) which are then bonded to other mounting elements in forming a compressor stator assembly, as taught in my copending U.S. application Ser. No. 598,657 filed Dec. 2, 1966. In such a stator assembly air flows from the leading edge 1 to the trailing edge $t$ of each blade. The direction of airflow is indicated generally by the arrows A.

The airflow provides a force loading which is more or less evenly applied against the concave surfaces of the blade from the top to the bottom thereof.

Longitudinally the blade is stressed in bending as a beam with fixed ends while transversely the stresses are generally minimal at the leading and trailing edges and maximum at the center. There are also torsional or twisting loads caused by nonuniformity in the air forces on the blade.

The blade 10 comprises a central core fabricated of glass fibers bonded together. Selection of the glass fibers and the bonding mechanism therefor is well within the ability of those skilled in the art of glass laminate manufacture. In any event the selection should be made to provide maximum fiber strength, maximum bonding strength, as well as maximum modulus of elasticity (E). In order that these properties of the core material may most effectively be taken advantage of, essentially all of the glass fibers are oriented parallel to each other and extending lengthwise or longitudinally of the blade.

The lengthwise orientation of the fibers in parallel relationship was first thought to give maximum strength and rigidity in bending in a direction normal to the length of the fibers. Further developments have indicated that the fibers may be arranged in layers alternately angled plus and minus as much as 10° from a true lengthwise axis. This angling of the fibers actually increases the bending strength of the composite structure but is not sufficient to give any significant torsional or transverse strength thereto. As herein used, reference to lengthwise orientation of fibers includes slightly angled relationships for maximum bending strength and stiffness as well as the parallel relationship illustrated in the drawing.

The blade 10 is clad with a metal skin 16 which is relatively thin and bonded to the core 14. The skin 16 may be fabricated in many ways as by folding a piece of foil about the leading edge of a preformed core. This assembly can then be placed in a mold to bond the skin to the core and to bond the skin together along the trailing edge of the blade.

The metal skin is of a thickness sufficient to withstand the stresses induced therein by longitudinal strain of the blade 10, which results in the concave surface being stressed in compression and the convex surface being stressed in tension. With a fiber glass core the thickness of the skin is sufficient to more than adequately withstand the transverse loadings on the blade and, further, at a sufficiently high torsional modulus to withstand twisting moments on the blade.

Additionally, the composite modulus of elasticity of the blade is substantially increased. This gives several advantages. First, the blade is stiffer and therefore maintains its aerodynamic shape more effectively. Further, the natural frequency of the blade is increased, making it less susceptible to vibration. The metal skin may be relatively thin so that for a small increase in weight over an unclad fiber glass blade, significant strength and rigidity improvements can be obtained. For example, a titanium skin of 0.008 inch increased transverse strength and stiffness by a factor of eight, increased shear modulus by a factor of four with a weight increase of only 30 percent. Longitudinal stiffness and strength also increased by about 25 percent.

The metal skin should be selected as having a high modulus of elasticity to specific weight ratio. The metal also has to be capable of meeting other operating requirements of the compressor.

While there is a small increase in weight over a corresponding unclad fiber glass composite blade, the described blade is significantly lighter than any blade capable of being formed by conventional, metal fabricating techniques, and, further, provides performance characteristics enabling its practical utilization in an operational compressor structure for a gas turbine engine.

The blade shown in FIG. 2 provides even more significant advantages in weight reduction with increased stiffness and strength. Blade 12 comprises a core 18 formed of parallel, graphite fibers disposed longitudinally, from end to end, of the blade and bonded suitably together. The core 18 is clad within a titanium skin 20 which is bonded thereto.

While graphite fiber technology is relatively new, it is a product available through commercial channels and has known characteristics. At the present time fibers are available in diameters in the order of 0.0003 inch with ultimate strengths in the order of 180,000 to 280,000 p.s.i. and a modulus of elasticity (E) of approximately 25—50 times $10^6$. When bonded, as a composite, to form a core having 70 percent (by volume) fibers, the composite, longitudinal modulus of elasticity is in the order of 16—35 times $10^6$ and strength is in the order of 130,000—200,000 p.s.i. Even at the lower range of the modulus of elasticity, the modulus of core 18 approximates that of titanium which is about 16.1 times $10^6$. With the moduli of elasticity so matched, the thickness of the skin may be selected as the minimum necessary to provide sufficient transverse strength for the blade since longitudinal stresses on the blade may be carried primarily by the graphite fibers without overstressing the skin material. Alternatively, it might be necessary to size the skin to provide the required shear modulus. However, in the usual circumstance a skin thickness sufficient to provide the desired transverse strength inherently will provide adequate shear modulus.

Typically, using graphite fibers instead of glass fibers enables a reduction of 50 percent in the thickness of the skin. Further, the combination of graphite fibers and a titanium skin gives a specific weight approximately equal to or slightly less than unclad fiber glass composites, with even greater stiffness and strength being provided.

Other combinations of materials could be equally effective. In a more specific aspect of the invention, the critical point is that the denser, heavier skin material be maintained a minimum to provide the necessary transverse modulus of elasticity or shear modulus without being stressed beyond its rupture strength. This is best accomplished by selecting materials such that the moduli of elasticity of the skin material and the core are approximately equal or the modulus of elasticity of the skin material is less than the modulus of elasticity of the fibers. In other words, the lighter fibers take the higher longitudinal stresses, while the heavier skin takes the transverse and twisting loading on the blade with maximum efficiency. Again, the net overall effect is to provide a minimum weight blade with maximum strength and stiffness.

While the described materials are preferred and have been found to have superior properties, it is to be understood that in its broader aspects the present invention is not limited to the use of any specific material, but applicable to many other materials, particularly those which would come within the moduli of elasticity relationships described. For example, in the blade of FIG. 2, boron filaments could be substituted for the graphite filaments and steel could be substituted for titanium with advantage.

Another factor to be noted is that graphite fibers are even more susceptible to abrasion damage than glass fibers and that the described invention makes practical the use of graphite fibers in turbomachinery blades.

It will also be appreciated that the core of fibers need not necessarily be solid and that a hollow fiber core could also be employed, particularly where the blades have a large cross section. While the present embodiments are fixed compressor blades, referred to as stator vanes, the term "blade" is intended to include all rotating and stationary turbomachinery blades. These and other modifications of the disclosed embodiments will occur to those skilled in the art within the scope of the present inventive concepts which are therefore to be limited solely to the subject matter claimed.

Having thus described the invention, what is claimed as novel and desired to be secured by Letters Patent of the United States is:

I claim:

1. A turbomachinery blade having an aerodynamic cross section and comprising:

a central core formed by a multiplicity of thin fibers, characterized in that the fibers are densely compacted in a large number of layers and essentially all of the fibers extend lengthwise of the blade and are bonded together, thereby forming a solid structure;

a relatively thin metal skin, clad about said core and bonded thereto and supported thereby in a boxlike, structural load-carrying configuration; and whereby a turbomachinery blade as case in claim 1 wherein, the fibers of said core are formed of glass. stresses are carried primarily by the skin which is minimized in thickness and weight.

2. A turbomachinery blade as in claim 1 wherein, the fibers of said core are formed of glass.

3. A turbomachinery blade as in claim 2 wherein, the thickness of the skin is the minimum necessary to withstand longitudinal stresses on the blade.

4. A turbomachinery blade as in claim 1 wherein, the modulus of elasticity of the skin metal approximates or is less than that of the composite fiber core.

5. A turbomachinery blade as in claim 4 wherein, the thickness of the metal skin is the minimum necessary to withstand transverse loadings on the blade.

6. A turbomachinery blade as in claim 4 wherein, the skin is titanium and the core fibers are graphite.

PO-1050
(5/69)

UNITED STATES PATENT OFFICE
CERTIFICATE OF CORRECTION

Patent No. 3,572,971          Dated March 30, 1971

Inventor(s) David L. Seiwert

It is certified that error appears in the above-identified patent and that said Letters Patent are hereby corrected as shown below:

Column 4, lines 64 - 65, after whereby delete "a turbomachinery blade as case in claim 1 wherein, the fibers of said core are formed of glass and insert in place thereof --longitudinal stresses on the composite blade structure are carried primarily by the fibers and transverse and torsional--.

Signed and sealed this 3rd day of August 1971.

(SEAL)
Attest:

EDWARD M. FLETCHER, JR.          WILLIAM E. SCHUYLER, JR.
Attesting Officer          Commissioner of Patents